United States Patent
Tada

(10) Patent No.: US 10,356,263 B2
(45) Date of Patent: Jul. 16, 2019

(54) IMAGE READING APPARATUS, CONTROL METHOD THEREOF, AND STORAGE MEDIUM

(71) Applicant: CANON KABUSHIKI KAISHA, Tokyo (JP)

(72) Inventor: Shuhei Tada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/961,614

(22) Filed: Apr. 24, 2018

(65) Prior Publication Data

US 2018/0359383 A1 Dec. 13, 2018

(30) Foreign Application Priority Data

Jun. 8, 2017 (JP) .................................. 2017-113490

(51) Int. Cl.
G06K 9/00 (2006.01)
H04N 1/00 (2006.01)

(52) U.S. Cl.
CPC ..... *H04N 1/00816* (2013.01); *G06K 9/00463* (2013.01); *H04N 1/00819* (2013.01); *H04N 1/00997* (2013.01)

(58) Field of Classification Search
None
See application file for complete search history.

(56) References Cited

U.S. PATENT DOCUMENTS

| 7,646,479 B2* | 1/2010 | Kokubo ................. B41J 11/009 356/239.1 |
| 7,924,477 B1* | 4/2011 | Malzbender .......... G06T 7/0004 358/474 |
| 9,325,875 B2 | 4/2016 | Kawanishi ......... H04N 1/02885 |
| 2008/0180754 A1* | 7/2008 | Miller ................ H04N 1/02815 358/474 |
| 2008/0225348 A1* | 9/2008 | Kubo ................. H04N 1/00525 358/474 |
| 2009/0109501 A1* | 4/2009 | Nagamochi .......... H04N 1/0311 358/475 |
| 2014/0168719 A1* | 6/2014 | Miura ................ H04N 1/02815 358/474 |

(Continued)

FOREIGN PATENT DOCUMENTS

| JP | 2015-173350 | 10/2015 |
| JP | 2016-009876 | 1/2016 |

*Primary Examiner* — Anh-Vinh T Nguyen
(74) *Attorney, Agent, or Firm* — Venable LLP

(57) ABSTRACT

To specify the position of a crease on a document without necessitating an additional configuration, such as a new sensor and a reading angle switching mechanism. An image reading apparatus including: a light emission controlling unit controlling light emission patterns of a first light emitting unit and a second light emitting unit included in a image reading unit; and a determining unit performing determination relating to a crease produced on a document by comparing a first image obtained by reading the document in a first light emission pattern and a second image obtained by reading the document in a second light emission pattern; and wherein the second light emission pattern is different from the first light emission pattern in balance of a quantity of emitted light from the upstream side of a light receiving unit and a quantity of emitted light from the downstream side of the light receiving unit.

16 Claims, 11 Drawing Sheets

(56) References Cited

U.S. PATENT DOCUMENTS

2015/0151938 A1* 6/2015 Matsumoto ............. B65H 7/14
358/1.12
2017/0301105 A1* 10/2017 Workman ............. G06K 9/183

* cited by examiner

IMAGE READING APPARATUS, CONTROL METHOD THEREOF, AND STORAGE MEDIUM

BACKGROUND OF THE INVENTION

Field of the Invention

The present invention relates to an image reading apparatus that optically reads a document and a control method.

Description of the Related Art

So-called large-sized printed matter (document) improves convenience for carrying and storage by being folded. In the case where the folded document such as this is read optically by an image reading apparatus, the document floats up from a document table because of the influence of a crease. As a result of this, the quantity of reflected light from the surface of the document fluctuates and a read signal at an output level different from the original one is output. In order to accurately reproduce an image printed (formed) on the document, it becomes necessary to specify the crease position on the read image and perform correction processing for the specified portion.

In this respect, Japanese Patent Laid-Open No. 2016-9876 has disclosed a technique to control the reading operation by detecting capacitance between a document table and a document by a capacitance detection sensor provided in a document reading unit and cancelling the change in accordance with a change in the detected capacitance. This technique makes use of the fact that the value of capacitance is proportional to the floating amount of a document, and the average value of capacitance at the position where the document is read is found and in accordance with the found average value, the gain of the read value or the quantity of light for reading at the position is changed.

Further, Japanese Patent Laid-Open No. 2015-173350 has disclosed a technique to appropriately detect a correction-target area in a document by varying the angle of a light source at the time of reading by controlling the angle of irradiation in the case where there is one light source.

With the technique of Japanese Patent Laid-Open No. 2016-9876 described above, it is necessary to newly provide a sensor for detecting floating of a document due to the influence of a crease, in addition to an image sensor for reading an image, and therefore, cost is raised. Further, with the technique of Japanese Patent Laid-Open No. 2015-173350 described above, a mechanism for switching the reading angles is necessary, and therefore, the device configuration becomes complicated.

SUMMARY OF THE INVENTION

The image reading apparatus according to the present invention includes an image reading unit having: a light receiving unit configured to receive reflected light from a document; and a first light emitting unit and a second light emitting unit arranged on an upstream side and on a downstream side, respectively, with the light receiving unit being sandwiched in between in a reading direction of the document; a light emission controlling unit controlling light emission patterns of the first light emitting unit and the second light emitting unit included in the image reading unit; a determining unit performing determination relating to a crease produced on the document by comparing a first image obtained by reading the document in a first light emission pattern and a second image obtained by reading the document in a second light emission pattern; and wherein the second light emission pattern is different from the first light emission pattern in balance of a quantity of emitted light from the upstream side of the light receiving unit and a quantity of emitted light from the downstream side of the light receiving unit.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
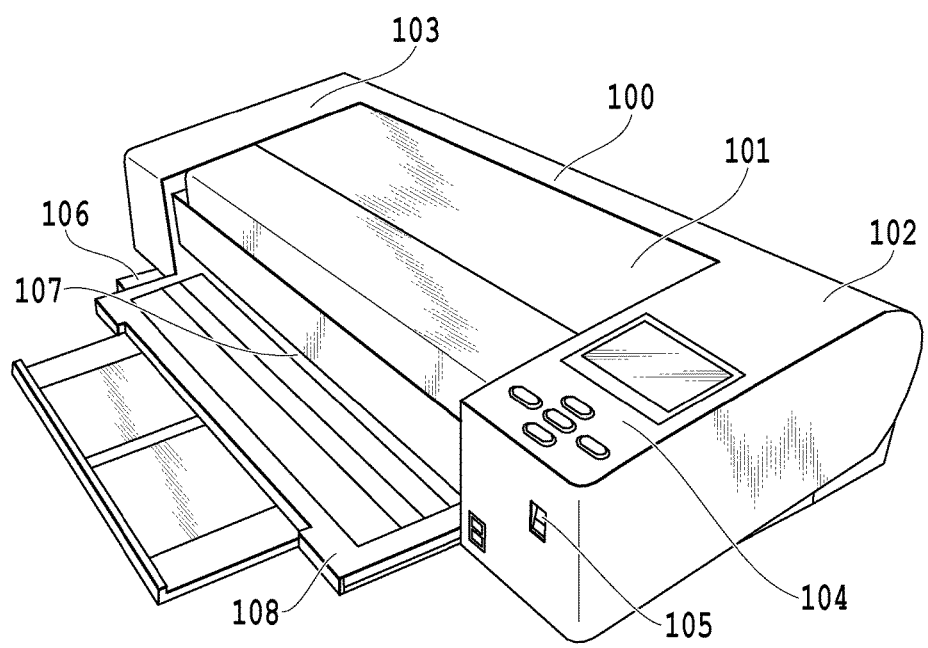
FIG. 1 is a perspective view of an image reading apparatus.
Figure 2:
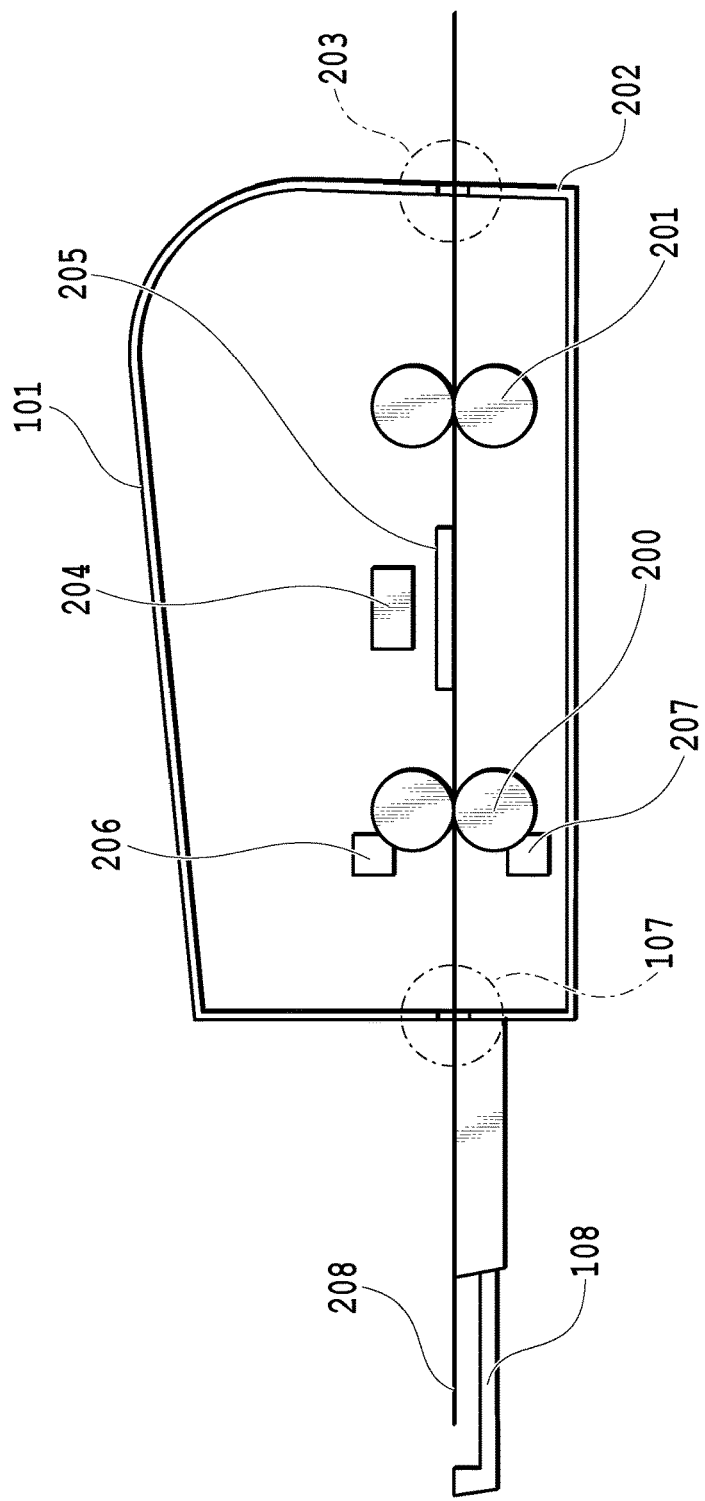
FIG. 2 is a sectional view of the image reading apparatus.

With reference to the drawings, an outline of a document reading (scanning) operation in an image reading apparatus according to the present embodiment is explained. FIG. 1 is a perspective view of the image reading apparatus and FIG. 2 is a sectional view of the image reading apparatus. As an image reading apparatus 100 of the present embodiment shown in FIG. 1 and FIG. 2, an image reading apparatus capable of reading of a large-sized document, such as A0 and B0, but the size of a reading-target document is not limited. The image reading apparatus 100 may be an apparatus specialized in scan, or for example, may be incorporated as a mechanism for implementing the scan function of an MFP (Multi Function Printer).

The exterior of the image reading apparatus 100 is made up of an upper side cover 101, a right side cover 102, an operation unit 104 provided on the right side cover 102, a left side cover 103, a release lever 106, a feed port 107, and a document table 108. Other components, such as a power source connector and an interface connector, are omitted.

Inside the image reading apparatus 100, document detection sensors 206 and 207, an upstream side conveyance roller 200, and a downstream side conveyance roller 201 exist. In the case where the power source of the image reading apparatus 100 is turned on and the state where the image reading apparatus 100 can be used is brought about, a user manually feeds a reading-target document 208 into the feed port 107. The manually fed document 208 passes the document detection sensors 206 and 207 and is conveyed toward the direction of a discharge port 203 by the upstream side conveyance controller 200 and the downstream side conveyance roller 201. At this time, the document 208 is pressed against a glass plate 205 and an image on the document 208 is read by an image sensor 204. For the read image data, it is possible for a user to select a desired output format, such as scan to copy, scan to print, and scan to USB memory. Further, it is also possible to transfer the image data to an external PC and the like via USB, LAN, and so on.

Figure 3:
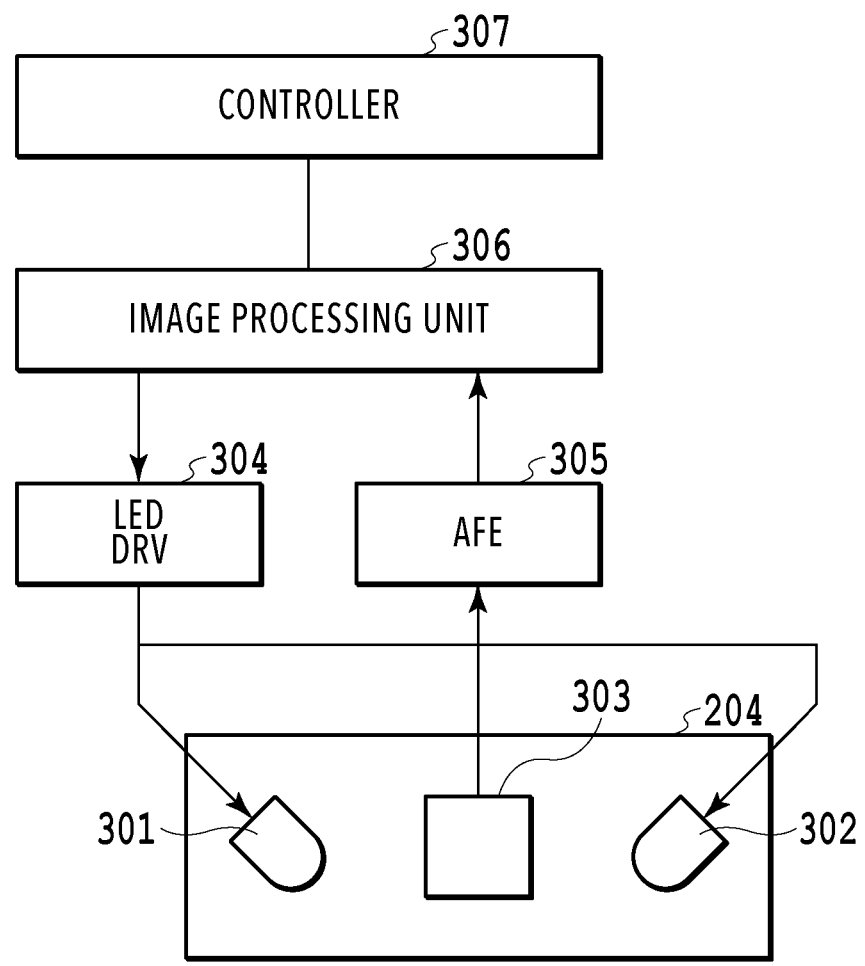
FIG. 3 is a block diagram showing a hardware configuration in charge of document reading processing.

FIG. 3 is a block diagram showing a hardware configuration in charge of document reading processing in the image reading apparatus 100. The image sensor 204 is a both-side irradiation image sensor including LEDs 301 and 302 as a light emitting unit and a light receiving unit 303. The light receiving unit 303 is arranged vertically with respect to the document reading direction and the LED 301 is arranged on the upstream side and the LED 302 is arranged on the downstream side, respectively, with the light receiving unit 303 being sandwiched in between. The LEDs 301 and 302 are controlled by an LED driver 304 as a light emission control unit and the document is irradiated with light by turning on both the LEDs at the same time or by turning one of the LEDs and then the other. Then, the light receiving unit 303 receives light reflected from the surface of the document 208. The light receiving unit 303 performs photoelectric conversion and outputs an analog voltage signal in accordance with the intensity of the reflected light to an AFE (Analog Front End) 305. The AFE 305 performs A/D conversion and outputs a digital signal to an image processing unit 306. The image processing unit 306 adjusts reading timing in accordance with conveyance of the document 208 and corrects the read image. A controller 307 is a main control unit including a CPU, a RAM, and so on, and controls the entire reading operation.

Figure 4:
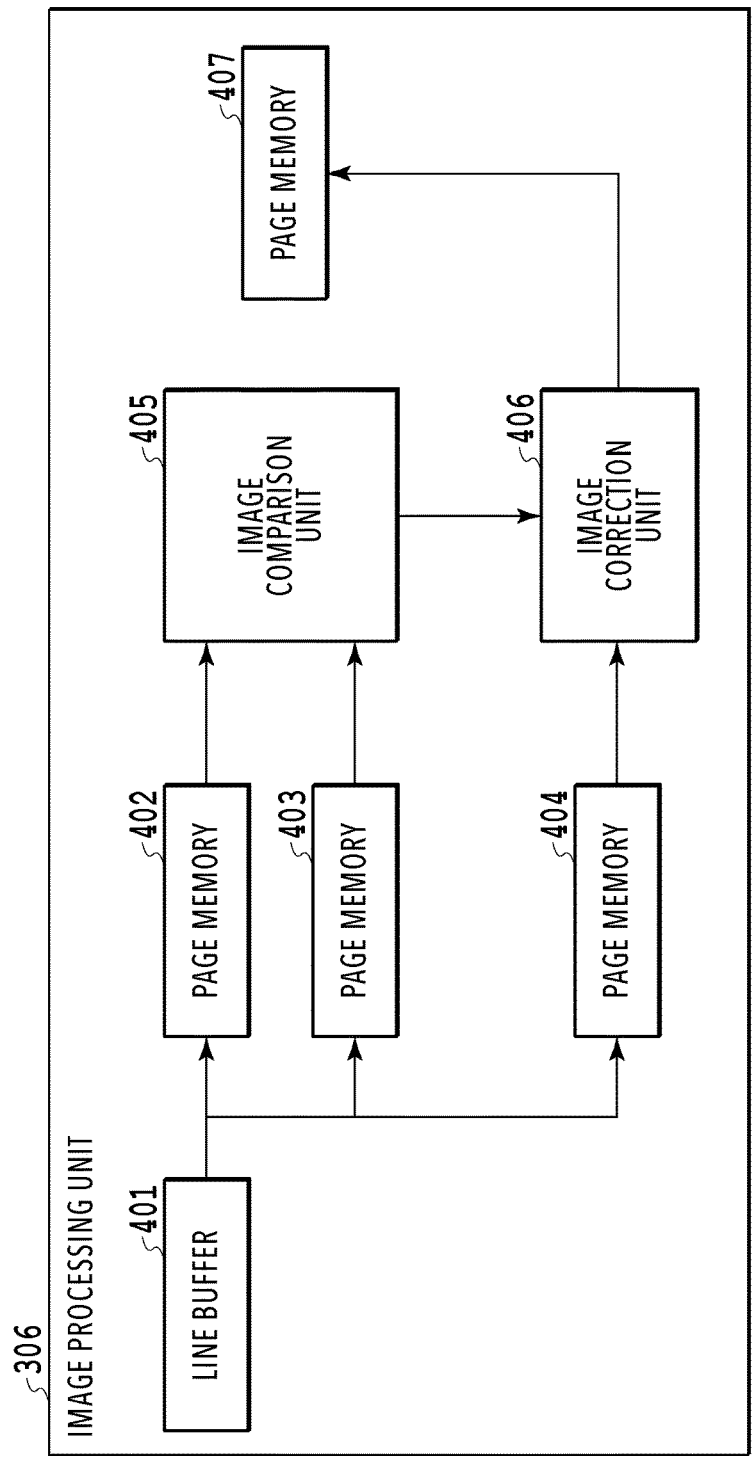
FIG. 4 is a diagram showing an internal configuration of an image processing unit according to a first embodiment.

FIG. 4 is a diagram showing an internal configuration of the image processing unit 306 according to the present embodiment. The image processing unit 306 includes a line buffer 401, page memories 402 to 404 and 407, an image comparison unit 405, and an image correction unit 406. The line buffer 401 temporarily stores a digital signal (image data) corresponding to one line, which is output from the AFE 305. The page memories 402, 403, and 404 read image data in units of lines in accordance with the difference in the light emission patterns of the LEDs 301 and 302, which will be described later, from the line buffer 401 and store the image data in the page memory corresponding to each light emission pattern. The image comparison unit 405 compares the image data corresponding to one page, which is input from the page memory 402, and the image data corresponding to one page, which is input from the page memory 403, and determines whether there is a difference between both pieces of the image data. In the case where a difference is detected between both pieces of the image data in the determination in the image comparison unit 405, the image correction unit 406 performs density correction processing in accordance with the difference for the image data corresponding to one page, which is input from the page memory 404. The page memory 407 stores the image data corresponding to one page corrected in accordance with the necessity in the image correction unit 406. The image data corresponding to one page stored in the page memory 407 is sent to a post-processing process appropriately.

Figure 5:
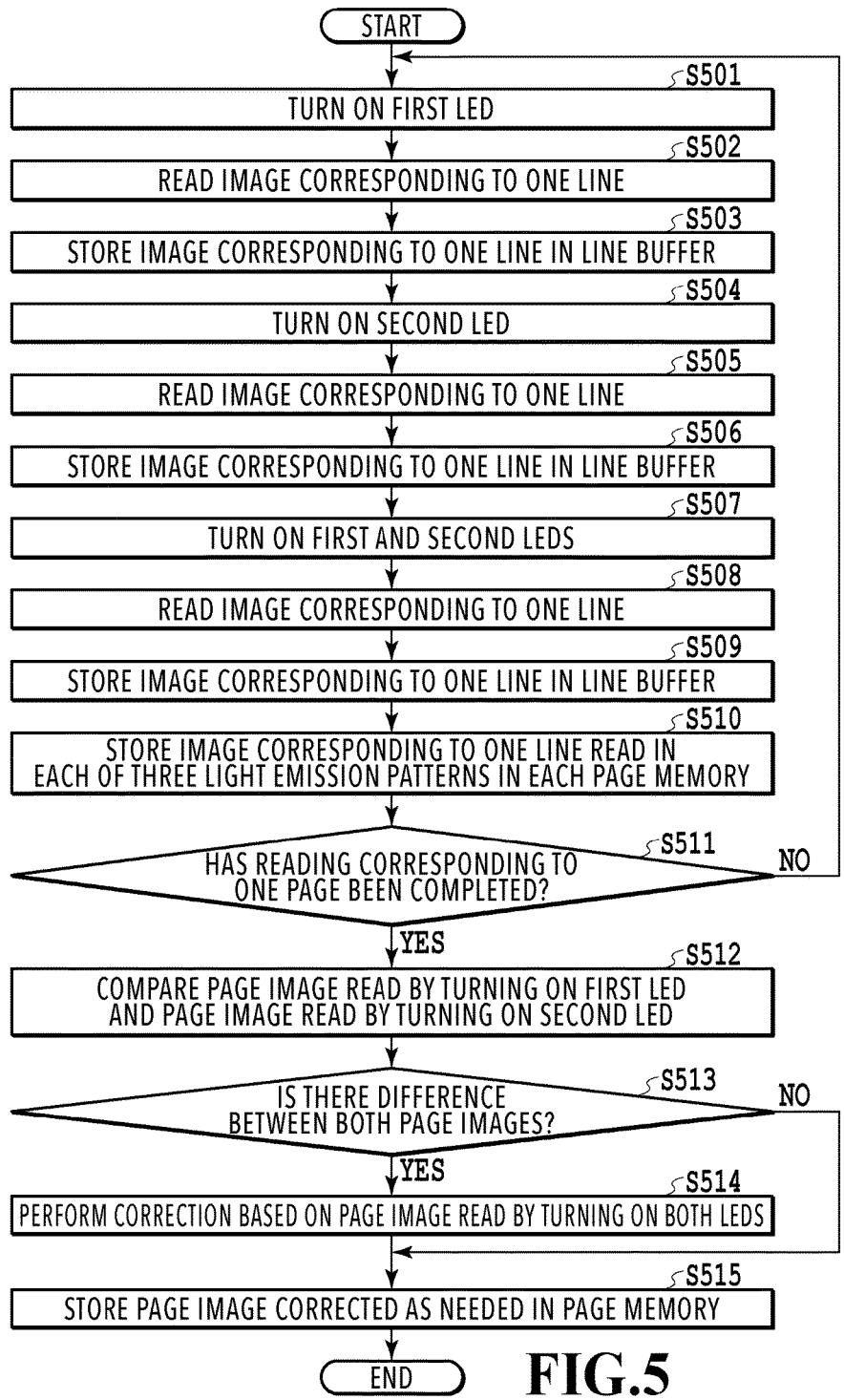
FIG. 5 is a flowchart showing a flow of document reading processing according to the first embodiment.

Following the above, document reading processing including specifying a crease position on a document in the image processing unit 306 is explained. FIG. 5 is a flowchart showing a flow of document reading processing including specifying a crease position on a document according to the present embodiment. This series of processing is implemented by the CPU within the controller 307 executing a predetermined program.

At step 501, control is performed so that only one of the two LEDs 301 and 302 (hereinafter, called a "first LED") within the image sensor 204 turns on. Then, at step 502, image reading is performed in the state where only the first LED is emitting light. Specifically, as described previously, by performing A/D conversion for the analog voltage signal in accordance with the reflected light from the document 208 in the AFE 305, image data of a digital signal corresponding to one line is generated. Hereinafter, the image that is read in the state where only the first LED is emitting light is called a "first image". The data of the first image corresponding to one line read at step 502 is stored in the line buffer 401 at step 503.

Next, at step 504, control is performed so that only the other LED of the two LEDs 301 and 302 (hereinafter, called a "second LED") within the image sensor 204 turns on. At step 505 that follows, image reading is performed in the state where only the second LED is emitting light. Hereinafter, the image that is read in the state where only the second LED is emitting light is called a "second image". The data of the second image corresponding to one line read at step 505 is stored in the line buffer 401 at step 506.

Then, at step 507, control is performed so that both the first LED and the second LED turn on. Then, the image is read in the state where the first LED and the second LED are emitting light and as at step 502 and step 505, image data of a digital signal corresponding to one line is generated. Hereinafter, the image that is read in the state where both the first LED and the second LED are emitting light is called a "third image". The data of the third image corresponding to one line read at step 507 is stored in the line buffer 401 at step 509.

At step 510, the image data corresponding to one line read in each of the above-described three light emission patterns is stored in the corresponding page memories 402 to 404, respectively. Specifically, the data of the first image is stored in the page memory 402, the data of the second image is stored in the page memory 403, and the data of the third image is stored in the page memory 404, respectively.

At step 511, whether reading of images corresponding to one page of the document has been completed is determined. In the case where reading of images corresponding to one page has been completed, the processing advances to step 512. On the other hand, in the case where reading of images corresponding to one page has not been completed, the processing returns to step 501 and reading of a remaining image (unscanned line) within the page is continued.

Figure 6:
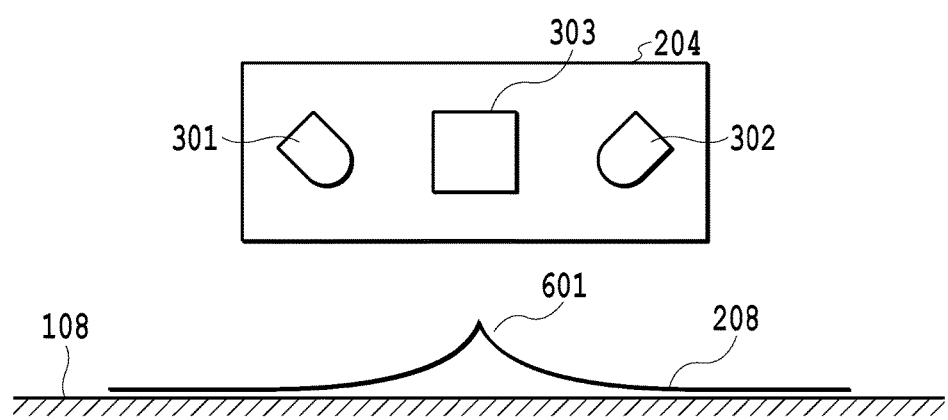
FIG. 6 is a diagram showing the way a document with a crease is read by an image sensor.
Figure 7:
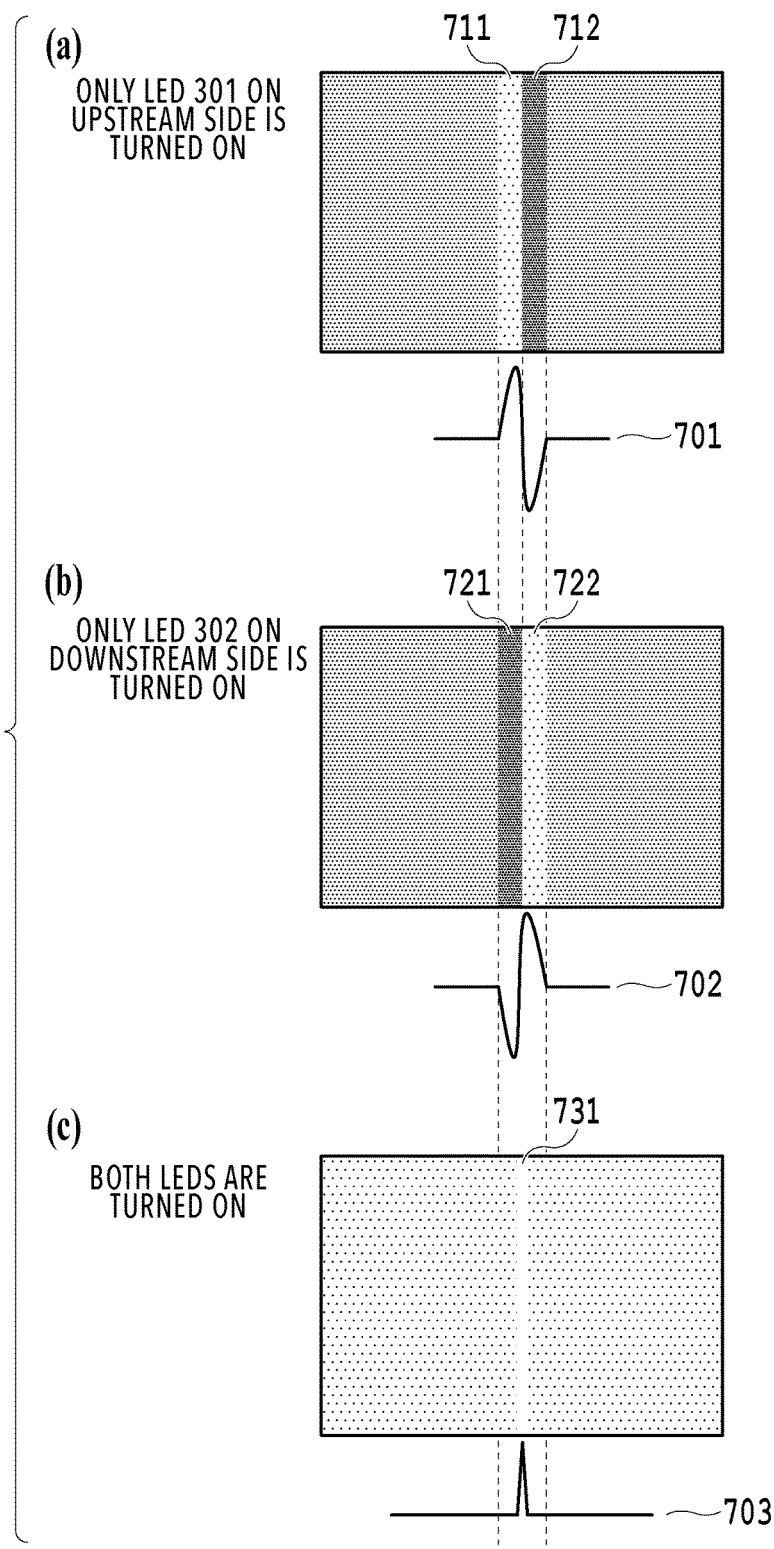
FIG. 7 is a diagram showing examples of images in units of pages read in three light emission patterns.

At step 512, in the image comparison unit 405, the data corresponding to one page of the first image and the data corresponding to one page of the second image stored in the page memories 402 and 403 respectively are acquired and a comparison between both pieces of the image data is performed. Here, the feature of an image to be read in the case where there is a crease produced on a document is explained. FIG. 6 is a diagram showing the way a document with a crease is read by the image sensor 204. FIG. 7 is a diagram showing examples of the first to third images in units of pages, which are obtained by reading a portion 601 that is mountain-folded with respect to the surface to be read of the document 208 in the above-described three light emission patterns. Hereinafter, the first to third images in units of pages are called a "first page image", a "second page image", and a "third page image", respectively. Then, (a) of FIG. 7 corresponds to the first page image that is read in the state where only the LED 301 on the upstream side is turned on and (b) of FIG. 7 corresponds to the second page image that is read in the state where only the LED 302 on the downstream side is turned on, respectively. Further, (c) of FIG. 7 corresponds to the third page image that is read in the state where both the LED 301 and the LED 302 are turned on. In FIG. 7, waveforms 701 to 703 each indicate the quantity of light that enters the light receiving unit 303 at each time of reading.

First, the first page image shown in (a) of FIG. 7 is explained. In the case where the portion on the upstream side with respect to the crease position is read, due to the influence of inclination of the paper surface, the light receiving unit 303 receives light specularly reflected from the paper surface. Because of this, compared to the case where the paper surface is flat without floating of the document due to the crease, the quantity of reflected light received by the light receiving unit 303 increases. Consequently, the amount of accumulated charge becomes excessive and an analog voltage signal at a level higher than the original level is output. That is, an image area (blown out highlights area) 711 whose density value is smaller and which is brighter than those in the original state appears. On the other hand, in the case where the portion on the downstream side with respect to the crease position is read, due to the influence of inclination of the paper surface, compared to the case where the paper surface is flat without floating of the document due to the crease, the quantity of reflected light received by the light receiving unit 303 decreases. Consequently, the amount of accumulated charge becomes short and an analog voltage signal at a level lower than the original level is output. That is, an image area (darkening area) 712 whose density value is larger and which is darker than those in the original state appears. The second page image in (b) of FIG. 7 is in the relationship opposite to that in (a) of FIG. 7 with respect to the upstream side and the downstream side. That is, in the case where the portion on the upstream side with respect to the crease position is read, the quantity of reflected light received by the light receiving unit 303 decreases and the amount of accumulated charge becomes short, and therefore, an analog voltage signal at a level lower than the original level is output and an image area 721 whose density value is larger and which is darker than those in the original state appears. On the other hand, in the case where the portion on the downstream side with respect to the crease position is read, the quantity of reflected light received by the light receiving unit 303 increases and the amount of accumulated charge becomes excessive, and therefore, an analog voltage signal at a level higher than the original level is output and an image area 722 whose density value is lower and which is brighter than those in the original state appears. Then, in the third page image shown in (c) of FIG. 7, although the influence by the crease is comparatively small, a streak-shaped bright image area 731 appears accompanying an increase in the quantity of reflected light near the crease position.

As described above, there is a difference in characteristics of the image area that appears near the crease position between the first page image and the second page image, and therefore, by comparing both the page images, it is possible to specify the position of the crease produced on the document (range affected by the crease). The comparison at this time is performed in units of predetermined blocks, for example, such as 5×5 pixels and 10×10 pixels. Specifically, the average of the density values of pixels within the block in each of the first image and the second image is found and in the case where the difference in the average values between corresponding blocks exceeds a predetermined threshold value (for example, 10% and the like) corresponding to a predetermined difference, it is determined that there is a difference. Such comparison and determination may be performed in units of pixels in place of units of blocks. Here, the case of a mountain fold is explained as an example, but in the case of a valley fold, it is also possible to similarly specify the position of a crease produced on a document.

At step 513, the processing is branched in accordance with the determination results at step 512. Specifically, in the case where there is a difference between the first page image and the second page image, the processing advances to step 514. On the other hand, in the case where there is no difference between the first page image and the second page image, the processing advances to step 515 and the data of the third page image stored in the page memory 404 is stored in the page memory 407 as it is.

That is, at step 513, whether or not there is a crease on the document is determined and the position of a crease is also determined. Then, in the case where it is determined that there is a crease on the document and the position of the crease is specified at step 513, the processing advances to step 514. On the other hand, in the case where it is determined that there is no crease on the document at step 513, the processing advances to step 515.

At step 514, in the image correction unit 406, the data of each page image stored in the page memories 402 to 404 is acquired and predetermined correction processing is performed. That is, based on the third page image comparatively slightly affected by the crease, processing to correct the density value is performed for the pixels in the range affected by the crease specified by the determination processing. In the case where the image is represented by luminance, such as RGB, the luminance value is corrected at step 514.

In the density correction, the data of the first page image and the second page image is also used. Specifically, as follows. First, as a preparation stage of correction, the quantity of emitted light is reduced generally to a degree in which the portion that becomes brighter due to the influence of the crease does not saturate at the time of reading the first and second images by turning on only one of the LEDs (steps 502 and 505). This is the reason that the first and second page images shown in (a) and (b) of FIG. 7 described previously are generally darker than the third page image in (c) of FIG. 7. Image data that combines the areas (bright areas) whose density value is smaller than the original density value in the first and second page images whose density is adjusted in this manner is generated and the portion corresponding to the crease position in the third page image is corrected. To explain with the examples in FIG. 7 described previously, by the image that combines the bright image areas 711 and 722 within the page images shown in (a) and (b) of FIG. 7, the density value of the pixel within a predetermined range including the image area 731 affected by the crease shown in (c) of FIG. 7 is corrected. Here, as the image that is used for correction, the image that combines the bright portions of the page images that are read in the state where the quantity of emitted light is reduced generally is adopted, but the correction method is not limited to this, For example, it may also be possible to read the first and second images in the state where the quantity of emitted light is increased generally and correct the third page image by using the image that combines the dark portions of the first and second page images whose density is adjusted as the image for correction. The data of the third page image corrected as described above is stored in the page memory 407 (step 515).

The above is the contents of the document reading processing including specifying the crease position of a document according to the present embodiment. Switching between turning on and off of the LED and the image reading speed in the above-described control flow are sufficiently fast compared to the document conveyance speed, and therefore, it is possible to handle the image data obtained in the three LED light emission patterns respectively as that obtained by reading the same position of the document. Then, by switching for each line as in the present embodiment, there is a merit that the reading time can be reduced. Of course, it may also be possible to switch the LED light emission patterns in units of pages in place of switching for each line.

Further, in the present embodiment, the dedicated page memory 407 for storing data of a page image after correction is prepared, but the configuration is not limited to this. For example, the configuration may be one in which in the case where a difference is detected between the first page image and the second page image, the data of the third page image before correction is overwritten by the data of the third page image after correction in the page memory 404.

According to the present embodiment, based on a difference between page images that are read by changing light emission patterns of the light emitting unit provided within the image sensor, the position of a crease on a reading-target document and the range affected by the crease are specified. Due to this, it is possible to accurately grasp the state of the crease produced on the document, and therefore, it is made possible to perform appropriate density correction in accordance with the state of the crease.

As crease determination processing different from that of the present embodiment, for example, it is assumed that the presence and position of a crease are determined according to whether or not the image read by only the LED 301 corresponds to the pattern of the image area shown in (a) of FIG. 7. In this case, it is assumed that an area whose density is low and an area whose density is high exist in the vicinity of the center of the document and the patterns of the areas resemble, for example, the patterns of the image areas indicated by 711 and 712 in (a) of FIG. 7. At this time, even though the document is not folded and no crease exists, the read images correspond to the patterns of the image areas indicated by 711 and 712 in (a) of FIG. 7, and therefore, there is a possibility that it is erroneously determined that a crease exists in the vicinity of the center of the document.

On the other hand, in the processing according to the present embodiment, by a comparison between the image read by only one of the two LEDs and the image read by only the other LED, the presence and position of a crease are determined. Because of this, for example, in the case where a document that resembles the patterns of the image areas indicated by 711 and 712 in (a) of FIG. 7 is read in the state where there is no crease, the reading results as shown in (a) of FIG. 7 are obtained by each of the above-described reading performed twice. Consequently, in this case, it is determined that there is no difference between the two read images at S513, and therefore, it is possible to prevent the above-described erroneous determination.

In the present embodiment, reading by only one of the two LEDs and reading by only the other LED are performed respectively. However, reading is not limited to this and reading by only one of the two LEDs and reading by both the LEDs may be performed. That is, it may also be possible not to perform the processing at S504 to S506 in FIG. 5. In this case, at S512, the image stored at S503 and the image stored at S509 are compared. In this case also, on a condition that a crease exists on the document, as shown in FIG. 7, a difference arises between both the read images. On the other hand, in the case where no crease exists on the document, a difference larger than that in the case where a crease exists does not occur between both the read images. Because of this, it is possible to obtain the above-described effect of the present embodiment.

Further, the number of light emitting units is not limited two and it may also be possible to provide three or more light emitting units dispersedly on the upstream side and on the downstream side in the reading direction with the light receiving unit 303 being sandwiched in between. In this case, on a condition that light emission control is performed so that the number of light emitting units used for reading on the upstream side or on the downstream side is different in a plurality of light emission patterns, it is possible to determine a crease. That is, the difference between a plurality of images obtained in the plurality of light emission patterns is larger in the case where a crease exists than in the case where no crease exists, and therefore, it is possible to determine the presence and position of a crease.

However, as shown in the waveforms 701 and 702 in (a) and (b) of FIG. 7, the values obtained by reading the crease portion of the document by using only one of the two LEDs are in the opposite phase in the first LED and in the second LED. Because of this, by causing only one of the two LEDs to emit light and switching the LEDs that are caused to emit light, it is possible to improve accuracy of crease determination.

Second Embodiment

In the first embodiment, the image that is read in the state where both the LEDs are turned on is used as the image that is the base at the time of correction. Next, an aspect is explained as a second embodiment in which image reading in the state where both the LEDs are turned on is not performed and one of images that are read in the state where only one LED is turned on is used as the image based on which correction is performed. Explanation of the basic hardware configuration and the like of the image reading apparatus 100 in common to those of the first embodiment is omitted and in the following, contents of an image processing unit, which is a different point, are explained mainly.

Figure 8:
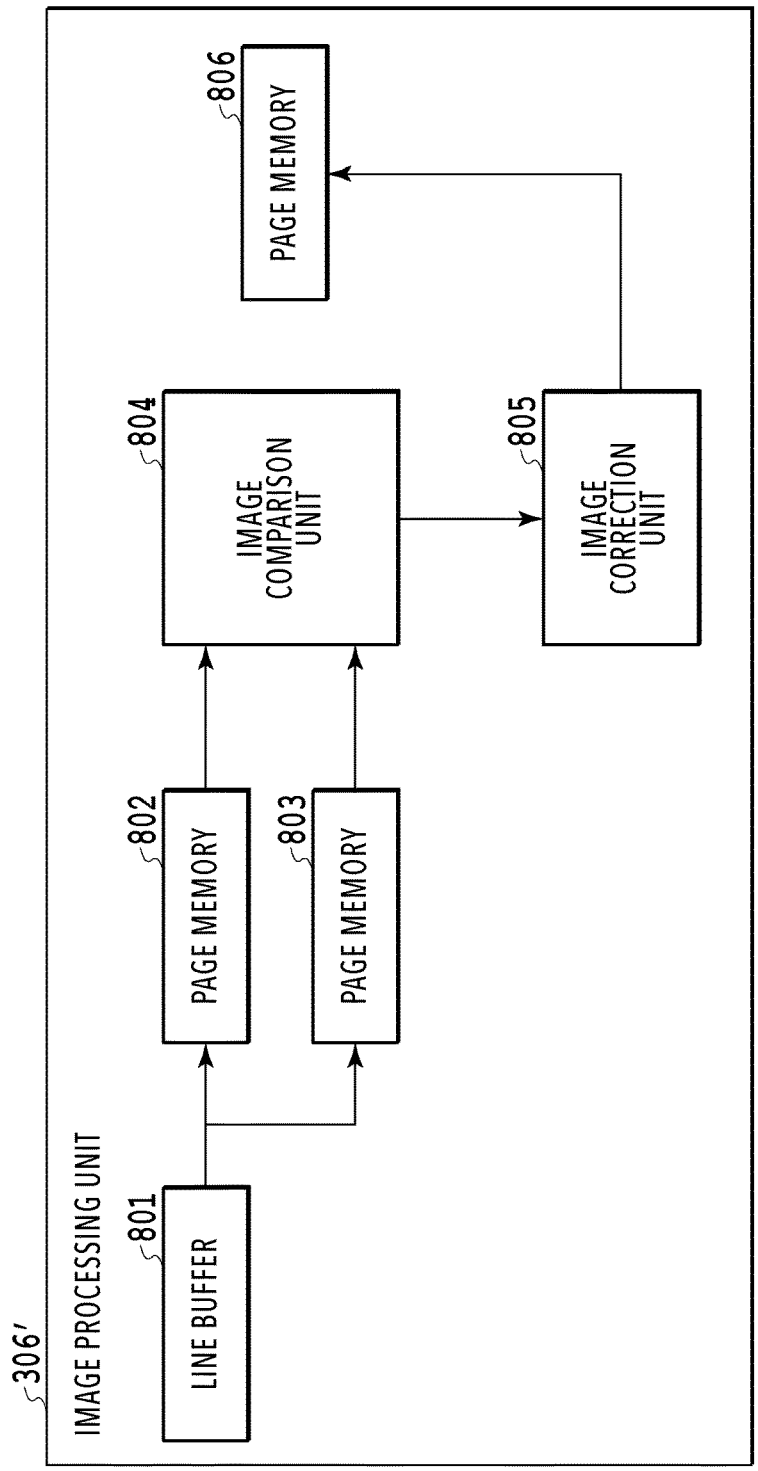
FIG. 8 is a diagram showing an internal configuration of an image processing unit according to a second embodiment.

FIG. 8 is a diagram showing an internal configuration of an image processing unit 306' according to the present embodiment. The image processing unit 306' includes a line buffer 801, page memories 802, 803, and 806, an image comparison unit 804, and an image correction unit 805. In the present embodiment, image reading in the state where both the first LED (LED 301) and the second LED (LED 302) are turned on is not performed, and therefore, a page memory corresponding to the page memory 404 in the first embodiment does not exist. The page image that is the base in the correction processing in the image correction unit 805 is one of the first and second page images stored in the page memories 802 and 803. As to which image to use as the base, it may be possible to select one of the page images, whose degree of blown out highlights and darkening due to the influence of a crease is smaller.

Figure 9:
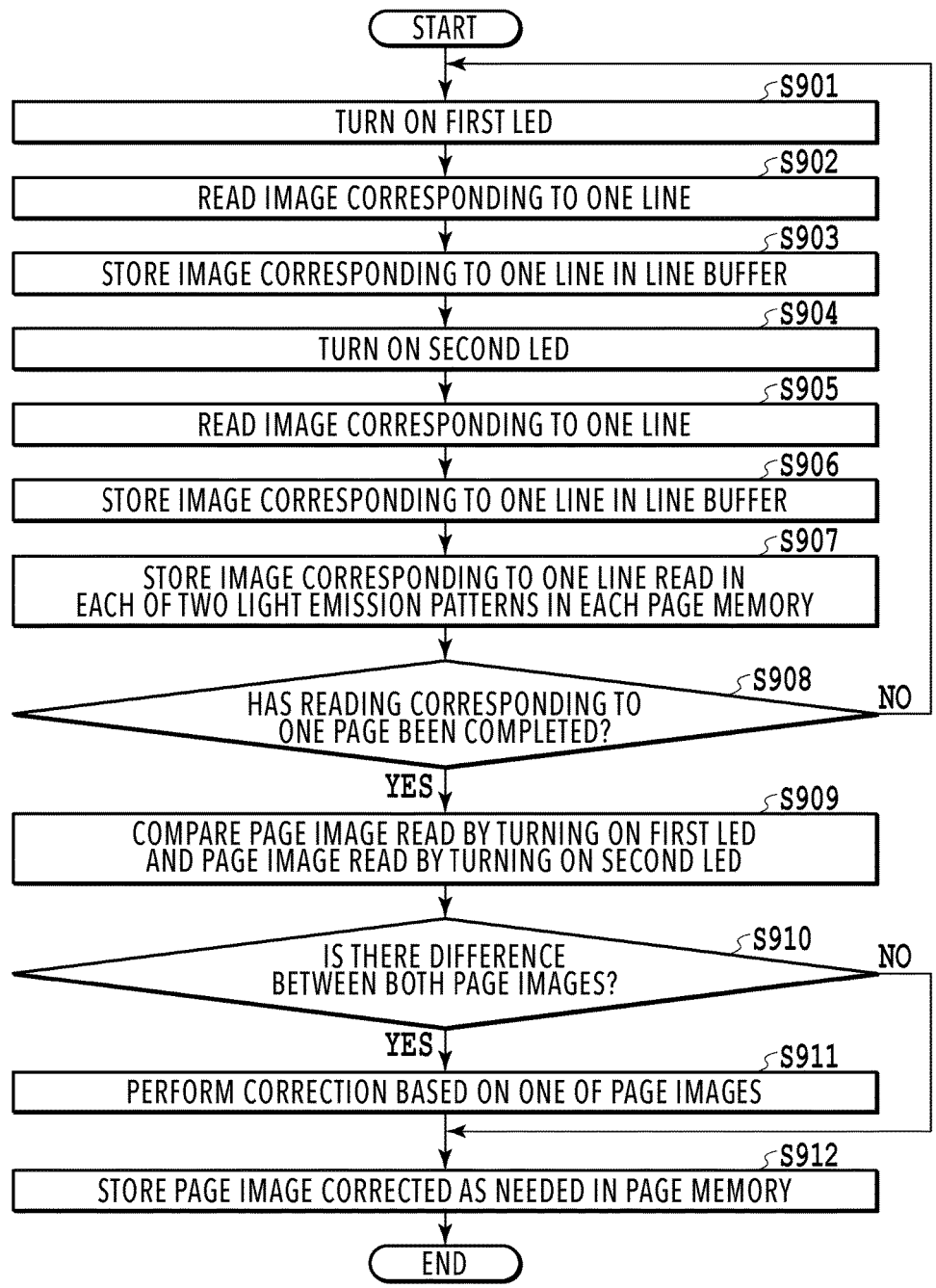
FIG. 9 is a flowchart showing a flow of document reading processing according to a third embodiment.

FIG. 9 is a flowchart showing a flow of document reading processing including specifying the position of a crease on a document according to the present embodiment. In the following, portions different from those of the flow in FIG. 5 of the first embodiment are explained mainly.

Step 901 to step 906 correspond to step 501 to step 506 of the first embodiment and the contents thereof are the same. At step 907, image data corresponding to one line that is read in two light emission patterns is stored in the corresponding page memories 802 and 803 respectively. Specifically, data of the first image is stored in the page memory 802 and data of the second image is stored in the page memory 803, respectively. Then, whether reading of images corresponding to one page of the document has been completed is determined (step 908) and in the case where reading has been completed, the processing advances to step 909 and in the case where reading has not been completed, the processing returns to step 901 and reading of a remaining image within the page is continued.

At step 909, in the image comparison unit 804, the data corresponding to one page of the first image and the data corresponding to one page of the second image stored in the page memories 802 and 803 respectively are acquired and a comparison between both pieces of the image data is performed. In the case where there is a difference between the first page image and the second page image, the processing advances to step 911. On the other hand, in the case where there is no difference between the first page image and the second page image, the processing advances to step 912 and the data of the page image stored in the page memory 802 or 803 is stored in the page memory 806 as it is.

At step 911, in the image correction unit 805, the data of one of the first page image stored in the page memory 802 and the second page image stored in the page memory 803 is selected as the image that is the base at the time of correction and the density correction processing described previously is performed. The data of the page image for which the correction has been performed is stored in the page memory 806 (step 912).

The above is the contents of the document reading processing including specifying the position of a crease on a document according to the present embodiment. As in the first embodiment, the configuration may be one in which the page memory 806 is not provided separately and in the case where a comparison between page images results in a difference, the data of the page image after correction is overwritten to the page memory 802 or 803.

According to the present embodiment, as the number of light emission patterns is small, the turning-on time of the LED is reduced accordingly, and therefore, it is possible to reduce the reading time compared to that of the first embodiment and further to suppress power consumption. Further, compared to the first embodiment, it is possible to reduce the number of page memories by one.

Third Embodiment

The first and second embodiments are the aspects in which a comparison between a plurality of pieces of image data obtained in a plurality of light emission patterns is performed in units of pages. Next, an aspect is explained as a third embodiment in which a comparison of image data is performed in units of lines to be read. The basic hardware configuration and the like of the image reading apparatus 100 are in common to those of the first and second embodiments, and therefore, in the following, contents of an image processing unit, which is a different point, are explained mainly.

Figure 10:
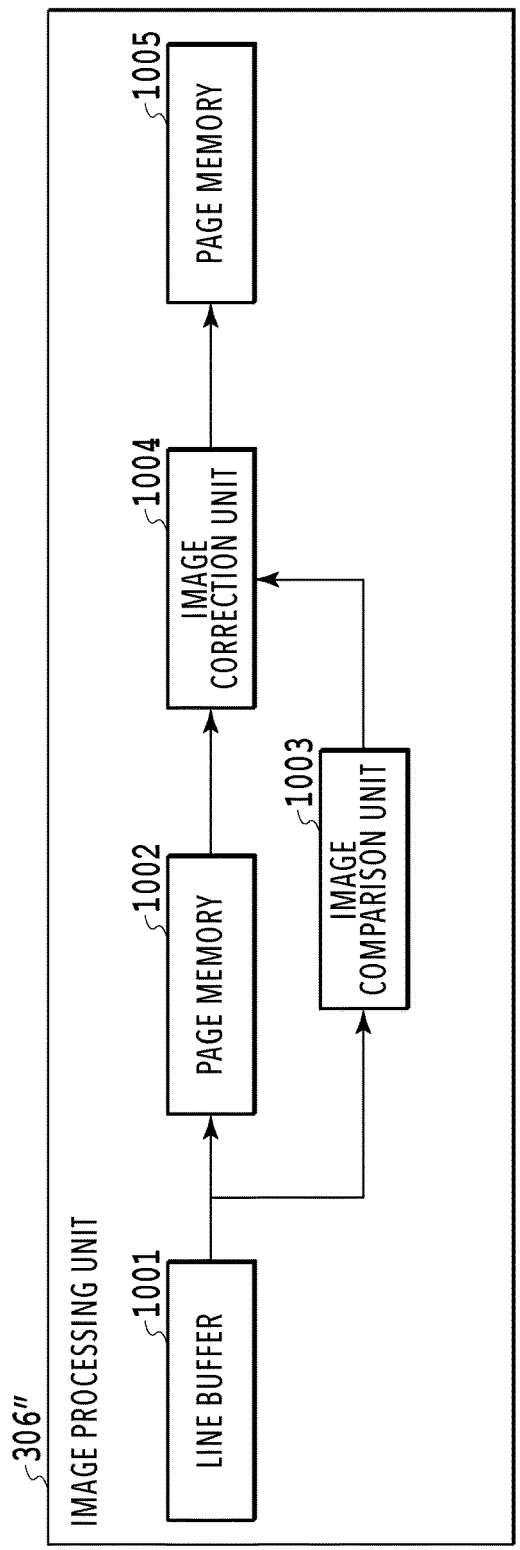
FIG. 10 is a diagram showing an internal configuration of an image processing unit according to the third embodiment.

FIG. 10 is a diagram showing an internal configuration of an image processing unit 306" according to the present embodiment. The image processing unit 306" includes a line buffer 1001, page memories 1002 and 1005, an image comparison unit 1003, and an image correction unit 1004. As in the first embodiment, in the present embodiment, LED turning-on control is performed in three light emission patterns: only the first LED (LED 301) is turned on, only the second LED (LED 302) is turned on, and both the first LED and the second LED are turned on. The image data corresponding to one line obtained in each light emission pattern is stored in the line buffer 1001, but only the third image data obtained by turning on both the first LED and the second LED is stored in the page memory 1002. The first and second image data obtained in the state where only the first LED or only the second LED is turned on is delivered to the image comparison unit 1003 without being sent to the page memory 1002. Then, processing to determine whether there is a difference between both pieces of the image data is performed therefor. The image correction unit 1004 corrects the third image data corresponding to one page stored in the page memory 1002 based on the determination results in the image comparison unit 1003 and stores the third image data in the page memory 1005.

Figure 11:
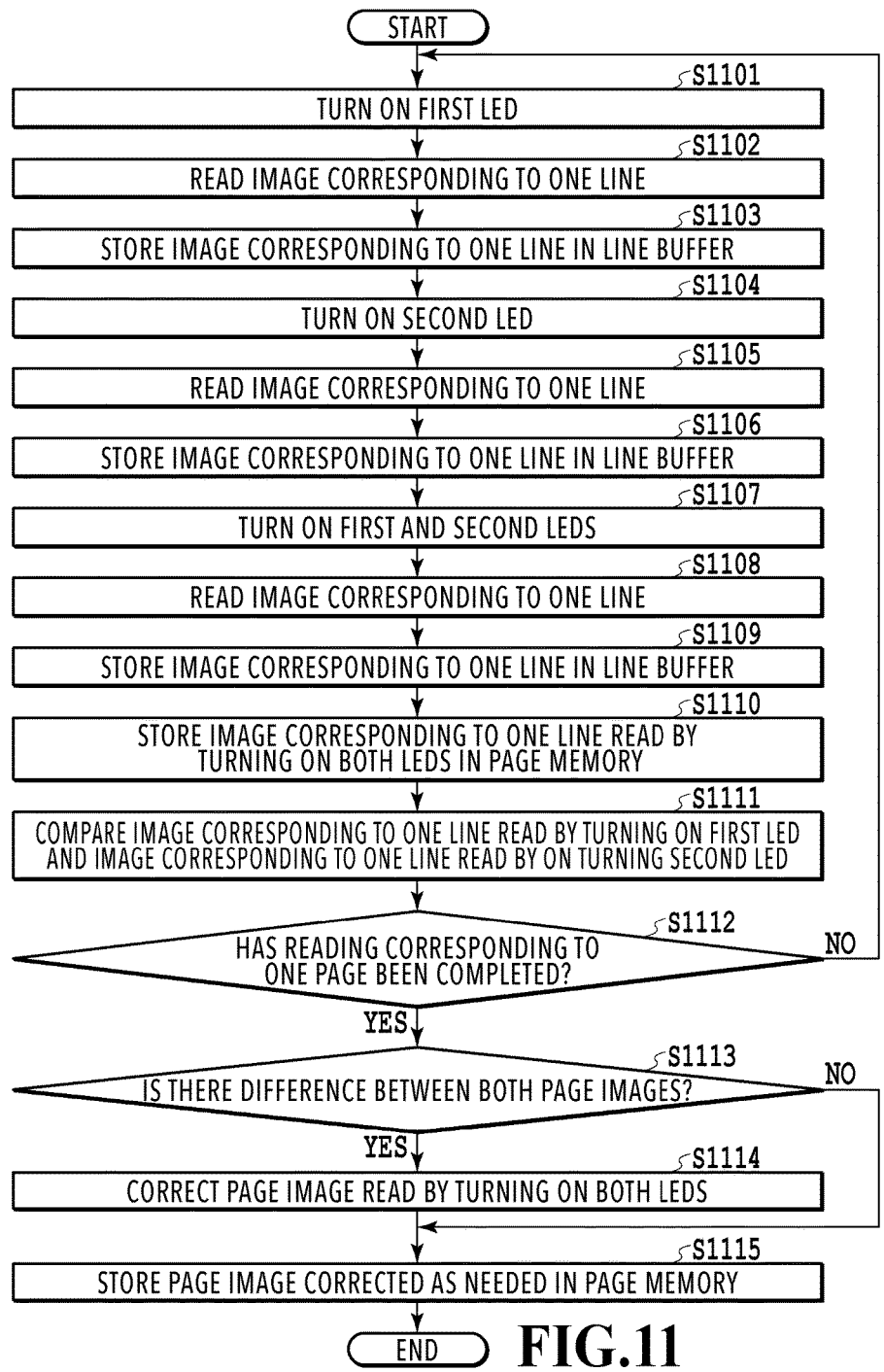
FIG. 11 is a flowchart showing a flow of document reading processing according to the third embodiment.

FIG. 11 is a flowchart showing a flow of document reading processing including specifying the position of a crease on a document according to the present embodiment. In the following, portions different from those of the flow in FIG. 5 of the first embodiment are explained mainly.

Step 1101 to step 1109 correspond to step 501 to step 509 of the first embodiment and the contents thereof are the same. At step 1110, the third image data corresponding to one line read in the state where both the LED 301 and the LED 302 are turned on is stored in the page memory 1002. Then, at step 1111, the image corresponding to one line read in the state where only the first LED (LED 301) is turned on and the image corresponding to one line read in the state where only the second LED (LED 302) is turned on are compared and determined. In the case where the results of the comparison indicate that there is a difference between both the images, information indicating that there is a difference between the image data of the read line is sent to the image correction unit 1004 along with the image data used for the comparison. Then, whether reading of images corresponding to one page of the document has been completed is determined (step 1112) and in the case where reading has been completed, the processing advances to step 1113 and in the case where reading has not been completed, the processing returns to step 1101 and reading of a remaining image within the page is continued.

After reading of images corresponding to one page is completed, at step 1113, the processing is branched according to the determination results at step 1111. In the case where there is a difference between the first page image and the second page image (in the case where the image correction unit 1004 is notified of information indicating that there is a difference), the processing advances to step 1114. On the other hand, in the case where there is no difference between the first page image and the second page image, the processing advances to step 1115 and the data of the page image stored in the page memory 1002 is stored in the page memory 1005 as it is.

At step 1114, in the image correction unit 1004, the correction processing described in the first embodiment is performed based on the data of the page image stored in the page memory 1002. Then, the data of the page image for which the correction has been performed is stored in the page memory 1005 (step 1115). As in the first embodiment, it may also be possible to update the data of the page image stored in the page memory 1002 in place of separately providing the page memory 1005 for storing the data of the page image after the correction.

The above is the contents of the document reading processing including specifying the position of a crease on a document according to the present embodiment. In the above-described flow, only comparison and determination are performed in units of lines to be read, but it may also be possible to perform correction also in units of lines to be read. By the present embodiment also, it is possible to accurately grasp the state of a crease produced on a document and it is made possible to perform appropriate density correction in accordance with the state of a crease.

Further, in the above-described embodiment, light emission control to switch between causing one light emitting unit to emit light and causing one light emitting unit not to emit light is performed in a plurality of light emission patterns. However, this is not limited and it may also be possible to provide a light emitting unit capable of adjusting the quantity of emitted light (intensity of light) on the upstream side and on the downstream side of the light emitting unit in the reading direction and thereby adjusting the quantity of emitted light in a plurality of light emission patterns. For example, as a first light emission pattern, by making the quantity of emitted light by the light emitting unit on the upstream side larger than the quantity of emitted light by the light emitting unit on the downstream side, it is possible to obtain the pattern of the image area shown in (a) of FIG. 7 at the time of reading a crease. Similarly, by reversing the balance of the quantity of emitted light, it is possible to obtain the pattern of the image area shown in (b) of FIG. 7. Consequently, by the adjustment of the quantity of emitted light such as this, it is also possible to obtain the same effect as that of the above-described embodiment.

That is, it is assumed that the balance of the quantity of emitted light from the upstream side and the quantity of emitted light from the downstream side of the light receiving unit in the reading direction is different in a plurality of light emission patterns. The influence in this case is greater at the portion of a crease of the document (or in the case where there is no crease) than at the portion that is not a crease (or in the case where there is a crease on the document). Because of this, in the case where the difference between a plurality of read images in the plurality of light emission patterns is large, it is possible to determine that the reading is reading of the portion of a crease of the document, or that the reading is reading of the document with a crease. Consequently, it is possible to determine whether or not there is a crease on the document and the position of a crease.

However, by switching between causing light to be emitted from the upstream side and causing light to be emitted from the downstream side of the light receiving unit as in the above-described embodiment, it is possible to make the quantity of emitted light on the upstream side larger or smaller than the quantity of emitted light on the downstream side without the need for the light emitting unit to be provided with the function to adjust the quantity of emitted light. Because of this, it is made possible to determine a crease in the above-described embodiment more easily than in the case where one light emitting unit adjusts the quantity of emitted light.

Further, in the above-described embodiment, in order to correct the portion corresponding to a crease in the read image, determination relating to a crease is performed. However, this is not limited and for example, it may also be possible to perform processing to notify a user of the presence of a crease in the case where it is determined that there is a crease on the document. In this case, it is only required to be capable of determining whether or not there is a crease on the document and the position of a crease does not need to be specified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to appropriately perform determination relating to a crease on a document without necessitating an additional configuration, such as a sensor other than an image sensor for reading an image and a reading angle switching mechanism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-113490, filed Jun. 8, 2017 which is hereby incorporated by reference wherein in its entirety.

What is claimed is:

1. An image reading apparatus comprising:
   an image reading unit including:
   a light receiving unit configured to receive reflected light from a document; and
   a first light emitting unit and a second light emitting unit arranged on an upstream side and on a downstream side, respectively, with the light receiving unit being sandwiched in between in a reading direction of the document;

a light emission controlling unit controlling light emission patterns of the first light emitting unit and the second light emitting unit included in the image reading unit;

a determining unit performing determination relating to a crease produced on the document by comparing a first image obtained by reading the document in a first light emission pattern and a second image obtained by reading the document in a second light emission pattern; and wherein the second light emission pattern is different from the first light emission pattern in balance of a quantity of emitted light from the upstream side of the light receiving unit and a quantity of emitted light from the downstream side of the light receiving unit.

2. The image reading apparatus according to claim 1, wherein
the light emission controlling unit switches between the first light emission pattern and the second light emission pattern in units of lines to be read.

3. The image reading apparatus according to claim 1, wherein
the light emission controlling unit switches between the first light emission pattern and the second light emission pattern in units of pages of the document.

4. The image reading apparatus according to claim 1, wherein
the determining unit determines whether or not there is a crease produced on the document.

5. The image reading apparatus according to claim 4, wherein
the determining unit determines that there is a crease produced on the document in a case where a difference between the first image and the second image is larger than a predetermined difference by a comparison.

6. The image reading apparatus according to claim 5, wherein
the determining unit performs the comparison in units of predetermined blocks or in units of pixels.

7. The image reading apparatus according to claim 6, wherein
the determining unit finds an average value of a density values of pixels within the predetermined block in each of the first image and the second image and determines whether or not there is a crease produced on the document based on results of comparing a difference between the average values of the corresponding predetermined blocks with a predetermined threshold value corresponding to the predetermined difference.

8. The image reading apparatus according to claim 1, wherein
the determining unit determines a position of a crease produced on the document.

9. The image reading apparatus according to claim 8, further comprising:
a correcting unit correcting a density of an image area corresponding to the crease based on the position of a crease produced on the document determined by the determining unit.

10. The image reading apparatus according to claim 9, wherein
the correcting unit corrects a density of an image area corresponding to the crease whose position is determined of a third image obtained by reading the document in a third light emission pattern in which both the first light emitting unit and the second light emitting unit are caused to emit light.

11. The image reading apparatus according to claim 10, wherein
the first image and the second image are read with a quantity of emitted light being reduced than that with which the third image is read, and
the correcting unit corrects the third image by using the first image and the second image read with the reduced quantity of emitted light.

12. The image reading apparatus according to claim 10, wherein
the first image and the second image are read with a quantity of emitted light being increased than that with which the third image is read, and
the correcting unit corrects the third image by using the first image and the second image read with the increased quantity of emitted light.

13. The image reading apparatus according to claim 9, wherein
the correcting unit corrects a density of an image area affected by the crease whose position is determined of one of the first image and the second image, whose degree of blown out highlights and darkening due to influence of the crease is smaller.

14. The image reading apparatus according to claim 1, wherein
the light emission controlling unit
causes light to be emitted from an upstream side of the light receiving unit in the reading direction and causes light not to be emitted from a downstream side of the light receiving unit, as the first light emission pattern, and
causes light not to be emitted from the upstream side of the light receiving unit in the reading direction and causes light to be emitted from the downstream side of the light receiving unit, as the second light emission pattern.

15. A control method of an image reading apparatus comprising: an image reading unit including: a light receiving unit configured to receive reflected light from a document; and a first light emitting unit and a second light emitting unit arranged on an upstream side and on a downstream side, respectively, with the light receiving unit being sandwiched in between in a reading direction of the document; and a light emission controlling unit controlling light emission patterns of the first light emitting unit and the second light emitting unit included in the image reading unit; the control method comprising the steps of:
obtaining a first image by causing the image reading unit to read the document in a first light emission pattern by the light emission controlling unit;
obtaining a second image by causing the image reading unit to read the document in a second light emission pattern by the light emission controlling unit, which is different from the first light emission pattern in balance of a quantity of emitted light from the upstream side of the light receiving unit and a quantity of emitted light from the downstream side of the light receiving unit; and
performing determination relating to a crease produced on the document by comparing the first image and the second image.

16. A non-transitory computer readable storage medium storing a program for causing a computer to perform a control method of an image reading apparatus comprising: an image reading unit including: a light receiving unit configured to receive reflected light from a document; and a first light emitting unit and a second light emitting unit arranged on an upstream side and on a downstream side, respectively, with the light receiving unit being sandwiched in between in a reading direction of the document; and a light emission controlling unit controlling light emission patterns of the first light emitting unit and the second light emitting unit included in the image reading unit; the control method comprising the steps of:

obtaining a first image by causing the image reading unit to read the document in a first light emission pattern by the light emission controlling unit;

obtaining a second image by causing the image reading unit to read the document in a second light emission pattern by the light emission controlling unit, which is different from the first light emission pattern in balance of a quantity of emitted light from the upstream side of the light receiving unit and a quantity of emitted light from the downstream side of the light receiving unit; and performing determination relating to a crease produced on the document by comparing the first image and the second image.

\* \* \* \* \*